United States Patent [19]

Kapadia

[11] Patent Number: 4,608,650
[45] Date of Patent: Aug. 26, 1986

[54] IMBALANCE MEASURING SYSTEM AND METHOD

[75] Inventor: Nikul S. Kapadia, El Toro, Calif.

[73] Assignee: Becton Dickinson and Company, San Juan Capistrano, Calif.

[21] Appl. No.: 521,725

[22] Filed: Aug. 9, 1983

[51] Int. Cl.$^4$ .............................................. G01N 29/04
[52] U.S. Cl. ..................................... 364/508; 73/462; 73/660; 364/724; 364/179
[58] Field of Search ............... 364/508, 565, 566, 724, 364/179; 73/462, 468, 579, 583, 660

[56] References Cited

U.S. PATENT DOCUMENTS

| | | | |
|---|---|---|---|
| 4,068,532 | 1/1978 | Green et al. | 73/462 |
| 4,298,948 | 11/1981 | Davis | 73/660 |
| 4,398,262 | 8/1983 | Williams. | |
| 4,426,641 | 1/1984 | Kurihara et al. | 364/508 |
| 4,442,712 | 4/1984 | Junck et al. | 73/462 |
| 4,488,240 | 12/1984 | Kapadia et al. | 364/508 |
| 4,502,328 | 3/1985 | Wood et al. | 364/508 |

Primary Examiner—Parshotam S. Lall
Attorney, Agent, or Firm—Marvin H. Kleinberg

[57] ABSTRACT

A vibration monitoring system analyzes tachometer signals of a rotating engine to ascertain the period of rotation from which sampling pulses at predetermined intervals can be generated. Sampled accelerometer data is processed by a nonrecursive tracking digital filter to determine peak velocity or displacement of rotating engine. In a different operating phase, apparatus determines the rotational location of the peak relative to an index or reference point on the rotating engine. The magnitude and location of the peak can be signaled for subsequent correction of the imbalance. The rotational velocity is monitored so that changes in velocity during a measurement invalidate the results and cause a repetition of the measurement cycles.

10 Claims, 5 Drawing Figures

DIGITAL FILTER

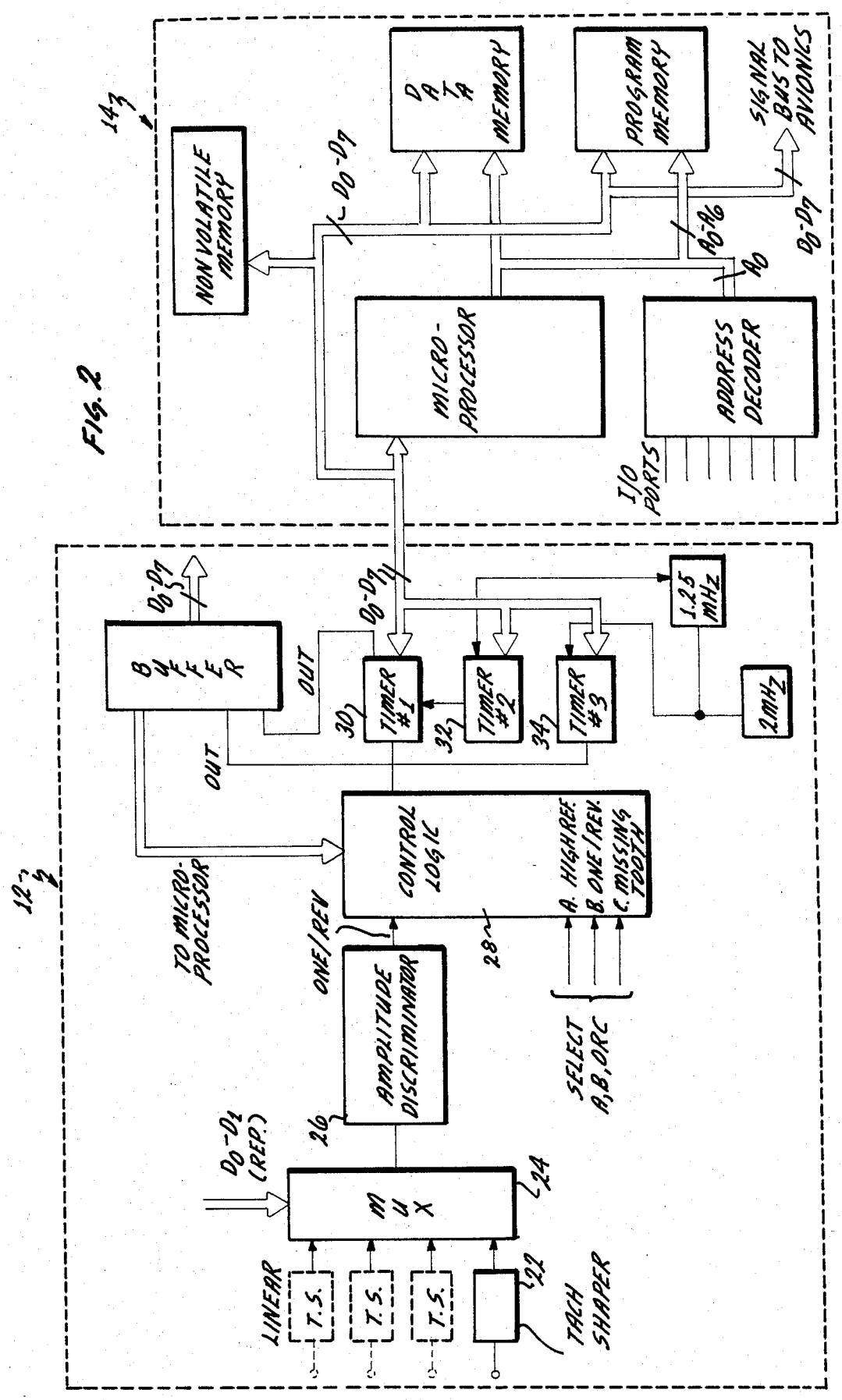

IMBALANCE MEASURING SYSTEM AND METHOD

The present invention relates to vibration monitoring systems and more particularly, to a system for measuring imbalance in rotating machinery and for determining the magnitude and placement of a compensating mass to substantially eliminate the unbalance condition.

BACKGROUND OF INVENTION

In recent years, systems have been created to monitor and analyze vibration in large rotating systems. Such systems are desirable because incipient failures may be predicted and possibly prevented. This is especially important if the rotating system is an aircraft engine where the consequences of a failure can be disastrous.

A contributing cause to vibration is a loss of rotational balance. This can be caused by minor damage to the rotating component from particles or other accidental causes any of which can result in a mass loss or an alteration of the distribution of mass. An aircraft jet engine with a turbo fan can, for example, encounter small rocks, gravel, ice or flying objects which, if they do not cause serious damage, may chip or gouge the rotating fan blade, creating a mass imbalance.

The change in mass distribution sets up a vibration at the rotational frequency, which can be monitored. In most systems, the vibrations are sensed by an accelerometer. These accelerometer signals can be integrated to provide velocity readings and the velocity signals can be integrated again to provide displacement signals. Given such a system, it is possible to calculate the amount of mass that must be added to a rotating component to restore rotational balance. Such a system does not, however, provide information as to where to add the mass.

In the case of turbo fan jet aircraft engines, the restoration of balance to the turbo fan can be a relatively simple task, if the location to which the mass must be added could be accurately identified. Systems exist to generate a signal that identifies a unique reference or index location on the rotating component. At least three such systems are currently known including a magnetic component associated with only one blade, a reference pulse generator, or a "short" or "absent" gear tooth.

Suitable filter circuitry has been devised which can select and present the unbalance factor. What is needed is circuitry which, given the extent of the imbalance, can, in response to index pulses, generate a location for the application of appropriate balancing masses. Such a system could trigger an appropriate counter to determine when, in the rotational cycle, the maximum occurred. It is then possible to determine the mass needed to restore balance and where the mass should be placed.

According to the present invention, an existing vibration monitoring system, such as disclosed in the copending application of Kapadia, et al, Ser. No. 344,561 filed Feb. 1, 1982, now U.S. Pat. No. 4,488,240, issued Dec. 14, 1984 and assigned to the assignee of the present application, can be adapted to provide the necessary information to rebalance an aircraft jet engine. That system included a nonrecursive digital filter and appropriate sampling circuits. A readout was provided provided in terms of velocity. However, within the system, a digital velocity signal was available from the digital filter and that signal could be integrated to yield a displacement signal, if desired.

According to the present invention, additional circuits are provided to detect a unique indexing pulse from the rotating machinery, which machinery may have to be modified in order to generate such a signal. Other circuits determine the maximum displacement during each cycle. In subsequent cycles, circuits can recognize displacements that are greater than a predetermined percentage of the maximum.

These recognized displacements can stop a high speed counter that is started by the indexing pulse. The count then represents a portion of the rotational cycle. A predetermined number of samples, taken over a period of time, are averaged over time to give a read out that, within acceptable tolerances, will identify the location of maximum displacement. This is 180° removed from the point to which mass must be added for balance.

Because of the electrical circuits, mechanical damping and the filtering techniques employed, the occurrence of the maximum may be "phase shifted" from its true location and appropriate phase compensations will have to be considered. Similarly, it is possible to compute an appropriate balancing weight from a given displacement value.

Utilizing the system of the present invention, it is possible to determine, in flight, the amount of mass needed to rebalance an engine. If only the turbo fan is balanced, the system determines on which blade to install the mass. The installation of the mass and therefore the balancing can be done on the ground during a minor service stop, without a disassembly of the engine. Such periodic rebalancing tends to keep minor imbalances for becoming major contributors to vibration and the attendant damage to the rotating components and the bearings and mountings.

The system of the present invention has three modes or phases of operation: a first, in which the speed of the engine is determined; a second, in which the accelerometer data is sampled and processed; and, a third phase, in which the location of the imbalance is determined. As a part of the second and third phases, the velocity of the engine is checked after each measurement to be sure that the data is still valid. If the engine frequency has changed during a measurement, the process must be repeated.

In alternative embodiments, wherein the Kapadia, et al, vibration monitoring system is not available, a relatively simple system can be devised that is specific for the balancing operation, which system utilizes many ideas and elements disclosed in Kapadia, et al. In such a system, appropriate sampling circuits can be derived that select suitably conditioned accelerometer signals which are integrated to provide velocity signals. The velocity signals are converted, at a relatively high rate, into a digital format.

The rotational velocity is monitored and by timing the duration of a cycle, that cycle interval can be subdivided into a predetermined number of samples. A counter, programmed to generate sampling pulses at the appropriate times, controls a nonrecursive digital filter. The digital filter output can be used as a velocity value or integrated to represent displacement.

The novel features which are believed to be characteristic of the invention, both as to organization and method of operation, together with further objects and advantages thereof will be better understood from the following description considered in connection with the accompanying drawings in which preferred embodiments of the invention are illustrated by way of example. It is to be expressly understood, however, that the drawings are for the purpose of illustration and description only and are not intended as a definition of the limits of the invention.

FIG. 2 is a block diagram of tachometer signal processing circuits for use in the system of FIG. 1;

Figure 1:
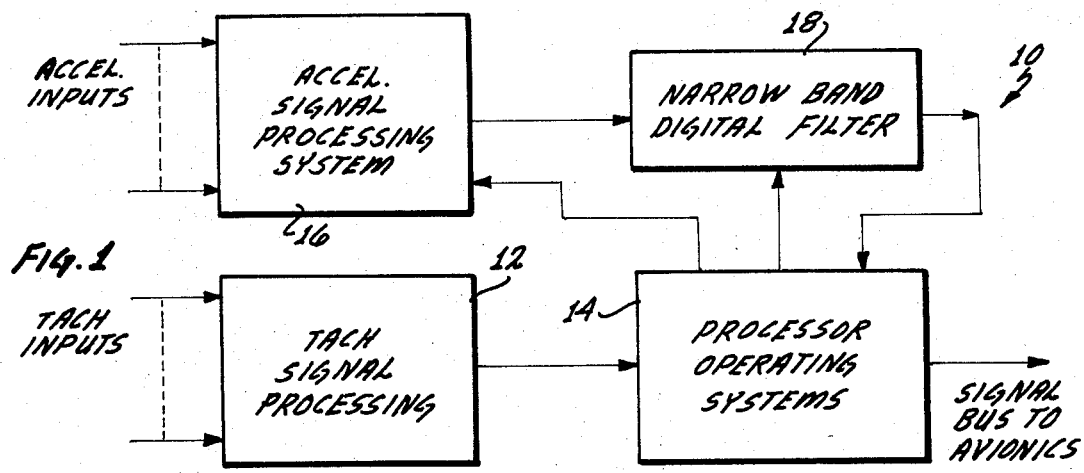
FIG. 1 is a block diagram of a vibration analysis system according to the present invention.

Turning first to FIG. 1, there is shown, in block diagram, an idealized vibration analysis system 10 according to the present invention. The system 10 includes tachometer signal processing circits 12 and a microprocessor and its associated operating systems 14. A separate accelerometer signal processing system 16 is controlled by the microprocessor 14 and provides data signals to a narrow band digital filter 18.

Figure 3:
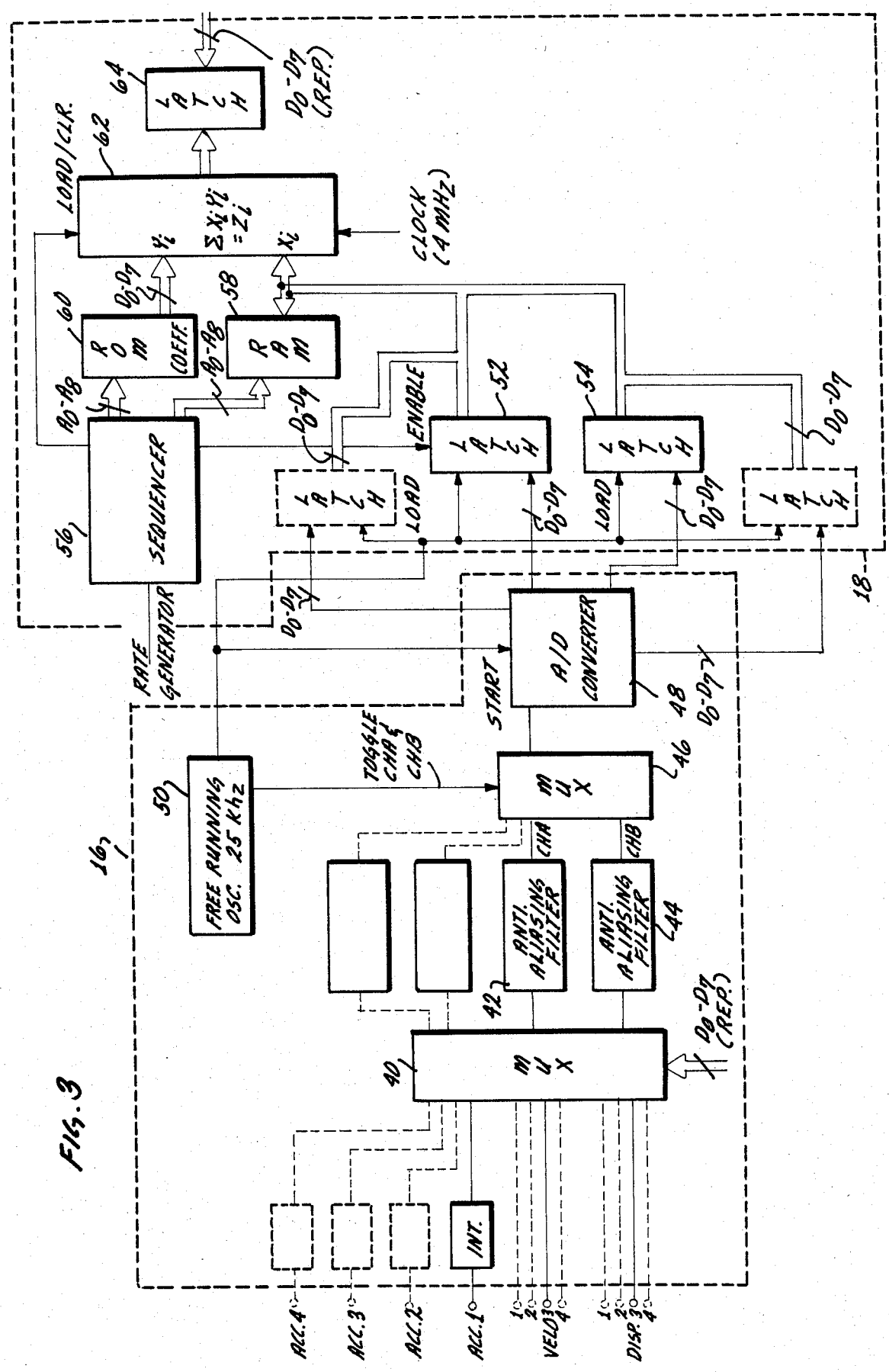
FIG. 3 is a block diagram of accelerometer signal processing circuits suitable for use in the combination of FIG. 1.

The elements of FIG. 1 are shown, in greater detail, in FIGS. 2 and 3. Turning first to FIG. 2, it is assumed that a plurality of tachometer signals is made available from the existing equipment installed on each engine. As shown, up to four tachometer signals can be accomodated, each being applied to a tachometer shaper circuit 22. Assuming that a plurality of tachometer signals are available, a multiplexer 24 is coupled to receive the tachometer signals and, under control of the microprocessor 14, selectively applies tachometer signals to an amplitude discriminator 26. The amplitude discriminator 26, in combination with a control logic unit 28, processes the applied tachometer signals. Depending upon the system employed by the engine to identify a reference location, the amplitude discriminator 26 generates an index pulse once per revolution of the fan.

If a separate reference or index signal generator is provided, that signal can be applied directly to the control logic unit 28 as the index signal. Of the other types of reference signal generators, one provides an enhanced signal once per revolution and another provides a substantially diminished signal once per revolution. A peak detector and comparator can be used to signal the occurrence of a signal that is significantly greater in amplitude than other similar signals. A simple logic circuit which compares a present signal with a prior signal can recognize a "missing" pulse in an otherwise regular signal train.

Alternatively, the microprocessor 14 with the "knowledge" of rotor speed determines the time interval between two adjacent blades. The microprocessor 14 looks for logic transitions continuously, in real time. When it detects the "missing" logic transition, it signals the reference blade position.

Three timing circuits, 30, 32, 34 are provided. The #1 Timer 30 and #2 Timer 32 have the dual function of determining tachometer frequency and determining the position of unbalance with respect to a reference blade. The tachometer frequency is determined by bypassing the peak detector, using the tachometer shaper 22 as a clipping element, rather than in its linear mode.

Control logic unit 28 includes a prescaler counter to divide input tachometer pulses by the number of blades on the fan rotor when the input circuit provides one pulse per blade, which may not be coincidental with the index pulse. The output of the prescaler provides a once per revolution timing signal to the gate of #1 Timer 30. The gate of #1 Timer 30 enables this timer to "count down" applied high speed clock pulses for so long as it is open. The period of one revolution is then available as a number which can be divided to obtain the proper sampling interval.

The #2 Timer 32, determines the programmable clock preselection, depending on the rotor type. The programmable clock is selected in such a way that the number of counts decremented by the #1 Timer 30, represents the rate at which accelerometer signals should be sampled and processed.

For example, if the rotor speed is 100 Hz or 10 milliseconds/rev., then the time between accelerometer samples is 10.0 milliseconds divided by 18 samples/cycle or 555.5 microseconds. Therefore, if a 2 MHz clock is to be used, the clock pulse duration for the counter is 0.5 microseconds per clock pulse, and the initial count required in the timer to generate the signals to define the proper sample period is equal to 1,111, or its binary equivalent.

If a count of 60 is set into the prescaler, corresponding to the number of fan blades, one output signal will occur each revolution to open the gate of the #1 timer 30 for exactly one revolution or 10,000 microseconds. If the #1 timer 30 is provided with clock signals from the #2 timer 32 at a 9 microsecond rate, 1,111 pulses will be counted to create the desired initial count. In order to accomplish this, the microprocessor initially loads a constant, in this case 18, into #2 timer 32. The input 2 MHz clock is then divided by 18 in #2 timer 32 to produce pulses at a 9 microsecond rate.

The #3 timer 34 is used to determine the sample rate for the digital filter circuits. The #3 timer 34 is loaded with the count of 1,111, obtained from the #1 timer 30, to obtain the correct sampling rate for a rotor speed of 100 Hz. After determining rotor speed in #1 timer 30, the #3 timer 34 is loaded with a suitable constant (1,111 for 100 Hz) to derive a sampling rate for the measured rotor speed. Once the constant is empirically determined, in a next phase of operation the #1 and #2 timers 30, 32 are then used for determining position of unbalance with respect to reference blade.

While the example above serves to explain the process, in a typical apparatus, during the start-up phase, a particular predetermined number is placed in the #1 Timer 30 and the 9 microsecond clock (1/18 the rate of the 2 MHz clock) decrements the pre-determined number. The number remaining in the #1 Timer at the end of one revolution is applied to the microprocessor 14 which determines what the appropriate constant should be for generation of the sampling intervals. In the above example of a 100 Hz motor speed, the constant will be 1111. If #3 Timer 34 is now driven by the basic 2 MHz clock, a sampling output will be provided 18 times per revolution at a rotor speed of 100 Hz.

In the position locating phase, #1 Timer 30 is preloaded with a number representative of a full cycle or 360°. Next, from a look-up table in the microprocessor 14, a constant is placed in the #2 Timer 32 which will provide 360 counts per revolution for a 1° resolution or 180 counts per revolution for 2° resolution. A second, 1.25 MHz clock is used in this phase to drive the #2 Timer 32.

For a 2° resolution at 100 Hz, the elapsed time should be 55.55 microseconds for each 2°. In order to produce pulses at that rate from the #2 Timer, 32 a constant must be placed in the #2 Timer by the microprocessor 14. The look-up table would provide, as a constant, the number 69.44 which, if decremented by clock pulses from a 1.25 MHz clock, will produce an output pulse once every 2°. This output pulse decrements the #1 Timer by 2° per pulse. As a data signal of predetermined value occurs, as will be explained below, the count in Timer #1 is stopped and the stored number representing relative position is placed in the microprocessor.

Alternatively, the #1 Timer 30 could be programmed so that the maximum value occurring during subsequent revolutions would be accumulated and averaged to provide an average value of location.

It is assumed that the rotor speed will remain constant during the period necessary to determine the position of unbalance. If the rotor speed does change, the information is discarded and the data gathering process is repeated. A new sampling rate is derived before the unbalance location can be identified since the digital filter 18, in the preferred embodiment, tracks the rotor frequency.

As shown in FIG. 3, the proposed embodiment of the accelerometer signal processing circuits 16 will multiplex up to four engines or rotating machines inasmuch as real time information is usually not required. If continuous, "real time" is required, the system can be dedicated to two rotating machines or engines.

In case of jet engines, the system is multiplexed, using the fan accelerometer on each engine. The bearing accelerometer is usually not used for balacing because there is no easy access to that part of an engine for balancing, however the information is necessary since fan unbalance affects the bearings and bearing "noise" affects the fan. The turbine accelerometer is not monitored since, if it detects high vibration levels, a major overhaul is usually required.

The system determines, for the fan component, unbalance amplitude and location of the unbalance. A multiplexer 40 will selectively multiplex two of several inputs and which will be considered channel A (i.e. the fan accelerometer) and Channel B (i.e. bearing or second fan accelerometer) information for each engine. Channel A and Channel B data always must be taken from the same engine. The input can be acceleration or velocity or displacement depending on the processing of the signals.

The output of multiplexer 40 representing the two selected inputs, Channel A and Channel B are passed through appropriate gating circuits into two, antialiasing filters, 42, 44 which can be low pass filters of 230 hz (3 db point) to avoid higher frequency foldback effects due to sampling. In one particular system, the rotor frequency of interest is centered around 200 Hz or 12,000 RPM. In the present embodiments, the system is not designed to determine unbalance amplitude or location at frequencies greater than 230 Hz or 13,800 RPM.

To determine the unbalance amplitude and location at higher frequencies, the antialiasing filter can be modified to accept rotor frequencies as high as 400 Hz, if two engines are to be simultaneously monitored. The 230 Hz (3 db point) four-pole antialiasing filters 42, 44 were implemented in the system to avoid interference from the aircraft power supply frequency of 400 Hz, normally found on jet aircraft. Accordingly, any power frequency pickups will be attenuated by at least 24 db, just by use of the antialiasing filter.

The outputs of the antialiasing filters 42, 44 pass to a second multiplexer 46 which selects the output of one of the two antialiasing filters 42, 44 for a high speed analog to digital conversion in an analog-to-digital converter 48 at constant rate of 25 KHz. The output of multiplexer 46 alternates between a 40 microsecond output from one antialiasing filter 42 to a 40 microsecond output from the other antialiasing filter 44.

The analog output is converted to digital form by the A-D converter 48. A start pulse of 2 microseconds duration from a free running oscillator 50 initiates the analog to digital conversion for the selected channel from multiplexer 46. The conversion can be completed within 25 microseconds. The digital output is applied to a pair of storage latches 52, 54 or to the digital filter circuits 18.

In the preferred embodiment, the digital filter circuits 18 include a pair of storage elements or latches 52, 54. The positive edge of a "start" signal is used to stabilize the digital data of a particular channel in latches 52, 54 for the A and B channels, respectively. The rate at which the storage latches 52, 54 get updated, is 12.5 kHz or every 80 microseconds, since the data alternates between the channels.

A sequencer 56 determines the sampling rate of a tracking filter—for example, as shown in the Kapadia, et al application, supra. It can be seen that at very low rotor speeds, say at 20 Hz, the sampling frequency is only 360 Hz, which is close to the 400 Hz power line frequency. At a rotor speed of 22.2 Hz, the 400 Hz power frequency component will look exactly like a rotor signal at the same frequency and can not be distinguished. Antialiasing filters are used to attenuate the power frequency component by at least 24 db before sampling. If the rotor frequency is greater than 25 Hz, the 400 Hz component will be attenuated by 24 db in the antialiasing filter, and by an additional 45 db in the tracking filter, for a total of 60 db.

The sequencer 56, determines the frequency with which data is entered into a First-In-First-Out Random Access Memory 58 (FIFO RAM). The rate at which storage latches 52, 54 get "refreshed" is independent of the rotor frequency, but the rate at which sequencer 56 refreshes data in the FIFO RAM storage 58 is directly dependent on the rotor frequency. The storage latches 52, 54 act as a prebuffer to the memory, saving the time of data conversion when the sequencer 56 "requests" data from the input channels.

The rate at which the sequencer 56 fills up the FIFO RAM 58 is determined by multiplying the rotating speed of the rotor by 18 samples per rotation (in the preferred embodiment). If the rotating speed is 50 Hz, the update rate will be 900 Hz. Similarly, if the rotating speed is 100 Hz, the update rate will be 1800 Hz.

The 18 samples/cycle sampling rate was selected to obtain a 10 Hz bandwidth at a 100 Hz rotating speed. By keeping the number of samples/cycles independent of rotating frequency, bandwidth will be 10% of the frequency. At 20 Hz rotating speed, the bandwidth will be 2 Hz.

The FIFO RAM 58 is divided into two blocks. One block keeps track of the channel "A" data and the second keeps track of channel "B" data. In the present embodiment, each block contains 256, eight-bit memory locations. The second multiplexer 46 selects either channel "A" or channel "B" through the A/D converter 48 and stores data in either of the storage latches 52, 54, which act as a prebuffer to the channel "A" or channel "B" portion of the FIFO RAM 58.

As the system multiplexes engine information to the input channels, it is required that FIFO RAM 58 be filled only with selected engine data to eliminate all remnants of data from a previous engine readout. The filter 18 selected is a nonrecursive digital filter which has no feedback. Any transients that might exist "die out" when all intermediate data points or FIFO memory cells are "refreshed" with new data.

To avoid "transient" effects of previous engine data, no engine data is processed immediately after a "new" engine is selected. The first thing that is required in the preferred embodiment, is to collect 256, 8-bit words of channel A data for the selected engine at its rotating speed. A 256 count, hardware counter within the sequencer 56 is initialized immediately after selection of an engine to be monitored. The counter counts until 256 data samples are stored in the FIFO RAM 58 at which time the counter signals the microprocessor 14 that "transients" from the previous engine reading are gone.

The above process of refreshing the memory adds a delay of 256 memory intervals after the selection of the new engine. The delay introduced corresponds to 14.22 cycles, which is a variable time delay, depending on rotor frequency. At a rotor frequency of 40 Hz, the delay will be 355.5 milliseconds while at 65 Hz the delay will be 218.8 milliseconds. For higher engine speeds, the delay will be shorter.

After the hardware counter has signalled that the FIFO RAM 58 contains only "new" engine data, the actual data processing starts. A discrete, convolution algorithm is performed on the 256 words or bytes of data. A preferred embodiment of the filter is shown in FIGS. 5 and 6 of the copending Kapadia, et al, application, here reproduced as FIGS. 4 and 5.

Figure 4:
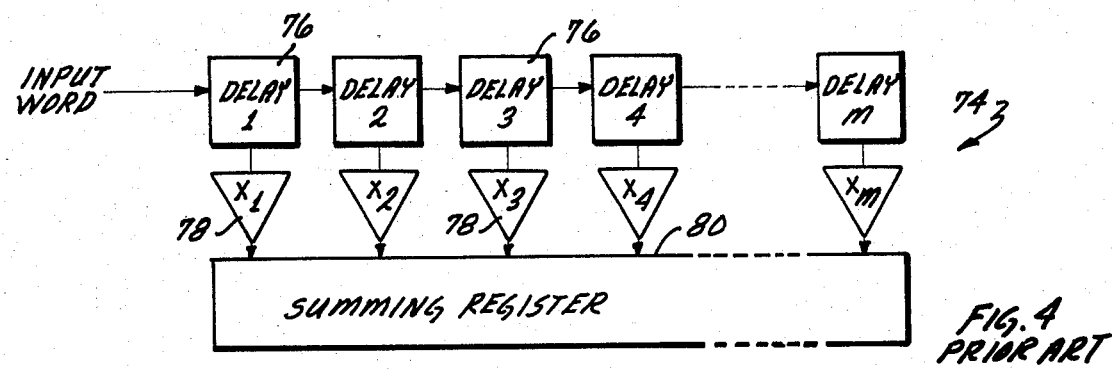
FIG. 4 is a simplified block diagram of a nonrecursive digital filter of the prior art.
Figure 5:
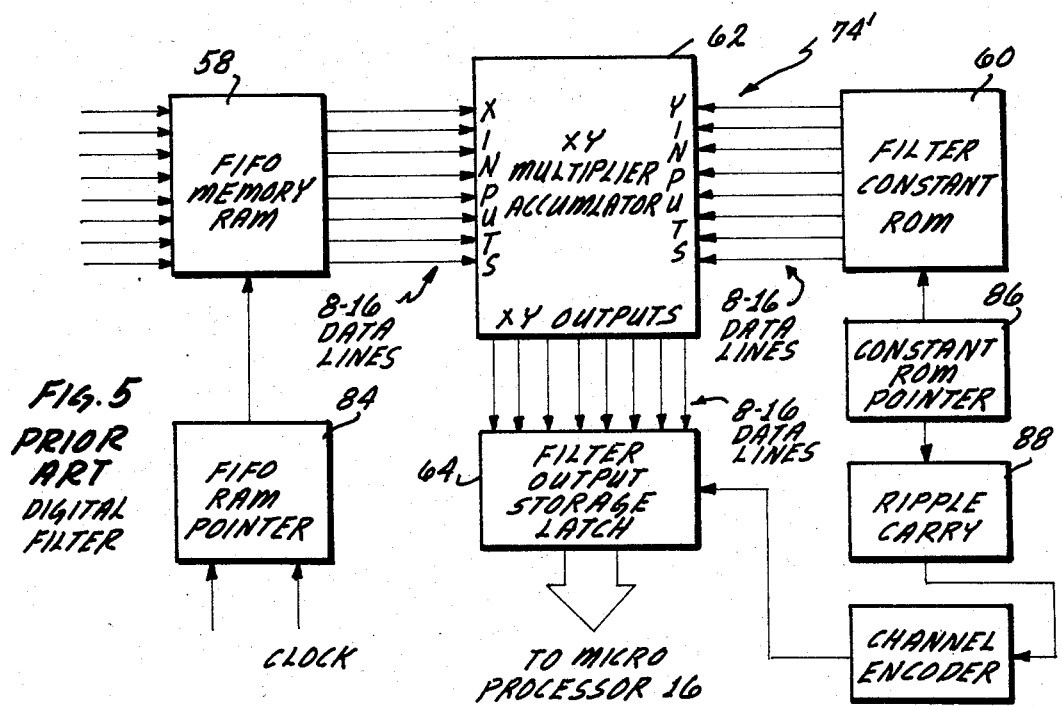
FIG. 5 is a more detailed block diagram of the filter of FIG. 4.

Turning next to FIG. 4, there is shown in simplified diagrammatic form, the structure of a typical nonrecursive digital filter 74. As shown, the filter 74 includes a plurality of delay elements 76 each of which can store one sample, expressed in digital form of the input signal information. As shown, the filter includes M delay elements 76 where M is a number sufficiently large to produce reasonable filtering. The sample in each delay element 76 is multiplied by a different weighting function in a multiplier element 78.

The theory of digital filtering is taught in a book entitled Digital Filters by R. W. Hamming, published by Prentice-Hall and copyrighted in 1977. Further, additional insight can be obtained from a review of the book, Theory and Applications of Digital Signal Processing by Rabiner and Gold, copyright 1975 by Bell Telephone Laboratories and The Lincoln Laboratories of the Massachusetts Institute of Technology, and published by Prentice-Hall.

The output of each multiplier element 78 is accumulated in a summing register 80. An output is then available after each sampling.

In operation, coefficients are selected which provide a gain of two or more in the digital filter. The signal output from the filter is inhibited until a full number of valid samples have been stored in the delay elements 76. In the present example, the filter includes 256 stages. Accordingly, the output of the summing register 80 is suppressed until 256 samples have been received are stored in the "delay" elements 76 and processed through the multiplier elements 78.

Once the delay line is loaded, then each succeeding sample can result in a meaningful filter output which can be applied to the microprocessor 16 for further analysis.

A nonrecursive digital filter 74' useful in the present system is illustrated in detail in FIG. 5. The digitized sample is applied to the FIFO RAM 58 in which a predetermined number of samples are stored. A RAM "pointer" 84 is an addressing counter which can access each of the memory locations to successively present the contents of each to the X-Y Multiplier accumulator circuit 62.

The RAM pointer 84 is arranged so that it "rests" after each cycle at a different address, so that each new data sample can be stored in a different location. When a predetermined number of "new" samples have been presented to the memory, the stored values from a "prior" cycle will be discarded and replaced by updating samples.

A second, Constant storage memory which may be a Read Only Memory (ROM) or a Random Access Memory (RAM) 60 is of a "size" equal to the number of stages in the digital filter, and stores the various coefficients that are used in achieving the digital filter. A constant pointer 86 or counter is used to cycle through the various address locations of the memory 60.

As each location of the FIFO RAM 58 and the memory 60 is addressed, their contents are applied to the multiplier 62 and the product of the two inputs is accumulated. In a cycle, each stored value in the RAM 58 will be multiplied by a different constant in the memory 60. When each constant has been addressed, a cycle is completed and the sum of the products is transferred to the filter output storage latch 64 which, in turn, applies the resultant quantity to the microprocessor 16.

The RAM pointer 84 includes a count which remains constant through a complete cycle of memory addresses. This fixed number, however, is changed by one from cycle to cycle, which has the effect of presenting the address holding the "oldest" value so that it can be replaced by the newest value from the detector circuit. The memory pointer 86 merely recycles. It has the effect of multiplying each stored sample with a different coefficient, so long as that sample remains in the memory.

In the preferred embodiment, especially adapted to work with two channels of information, the RAM 58 is doubled in size to accomodate samples from both channels. A ripple carry element 88 signals the completion of each cycle through the memory 60. The ripple signal is applied to the addressing portions of the FIFO RAM pointer circuit 84 so that a second, substantially duplicate memory stores the signals from the second channel. The stored number within the pointer 84 is then changed only after both a first cycle involving a sample from the first channel and a second cycle, involving a sample from the second channel have been completed.

When a next data sample is requested from sequencer 56, that new sample will be stored, replacing the earliest of the samples in the RAM 58. Since the addressing circuits can sequence through the memory in any desired order, the new sample can be considered as having shifted the contents by one place. For example, if the initial stored samples can be designated $X_0$ to $X_{255}$, the new sample is designated $X_{256}$ and earliest sample, Xo is "destroyed" or thrown away. Sample $X_{257}$ similarly dislaces sample $X_1$.

A new output sample will be produced whenever new input data word is requested by the sequencer 56. To eliminate any "race" condition between the input sample and the discrete convolution algorithm output, the multiplier accumularo 62 must be able to complete its algorithm twice within one sample interval at that rotating speed. At the very high rotor speed of 200 Hz, the sample rate will be 3600 Hz with 18 samples/cycle.

The time between samples is 278 microseconds, during which a total number of 512 multiplication and accumulation steps must be completed for channels A and B. The minimum speed, required to multiply and accumulate one sample of data is then 278/512 or approximately 540 nanoseconds. In the preferred embodiment, the system can multiply and accumulate one sample of data in less than 250 nanoseconds, thereby providing a reasonable margin of safety.

The discrete convolution integral as a nonrecursive filter provides a constant phase delay. The actual phase delay can be calculated by ½ (number of FIFO RAM samples—1). Since there are 256 "word" samples in the filter, the total delay will be 127.5 samples. If 18 samples are furnished per cycle, there are seven complete cycles and a remainder of 1.5 samples, which is equivalent to 30°, just by the convolution integral. This delay will be constant (independent of rotating speed) inasmuch as 18 samples/cycle are always taken in the preferred embodiment.

This property of constant phase delay is used to achieve the location of unbalance. The amplitude of unbalance is determined by averaging output samples $X_iY_i$ from the discrete convolution algorithm for only one complete cycle, that is only 18 samples. The average output provides the amplitude of unbalance which also helps in determining the angular displacement of the peak of unbalance from the reference blade.

The position of unbalance in the third phase of operation is determined by first obtaining a once per revolution tachometer signal from any one of at least three potential tachometer imputs, such as a Magnetic "beeper" or an insert to a blade, a "missing," or shorter tooth, or an altrnative, independent index signal, occurring once per revolution.

In the case of third type of input, no further processing is required to determine the reference blade position.

Referring again to FIG. 2, the linear tachometer signal shaper 22 attenuates the input signal by 50%. It also acts as a buffer to the tachometer multiplexer 24. The multiplexer 24 selects one of the four tachometer inputs (i.e., two per engine) for obtaining a once per revolution output signal. An amplitude discriminator 26 includes a peak detector, comparator and a diode wave shaper. (not shown)

The peak detector detects the amplitude of the peak and attenuates it by 10% before setting limits for the comparator. The comparator compares the tachometer input with a comparator set voltage level. When the amplitude of the tachometer signal exceeds the comparator set voltage level, the output of diode wave shaper provides an index signal, indicating the reference blade to assist in calculating the peak amplitude position of unbalance.

If second type of tachometer signal, providing a "missing" or lower amplitude pulse, indicating the reference blade position, the position of the reference blade can be determined by a similar hardware circuit including a peak detector, comparator, diode waveshaper and microprocessor interface. The microprocessor interface is required in this case to determine, logically, the reference blade position. The function of the linear tachometer shaper, peak detector and diode waveshaper is exactly same as discussed previously.

Once the validity of data is checked, the microprocessor 14 manipulates the phase lag or lead from electrical circuits or mechanical mounting. The microprocessor 14 can refer to a "look up" table to determine a correction factor for phase, depending on the rotor speed.

A typical phase correction table is set out below as Table 1 for rotor speeds between 40 Hz and 65.3 Hz.

TABLE 1

| PHASE | FREQUENCY |
|---|---|
| (176°) | 65.3 HZ |
| (178°) | 64.8 HZ |
| (178°) | 64.2 HZ |
| (180°) | 63.6 HZ |
| (182°) | 63.1 HZ |
| (182°) | 63.6 HZ |
| (184°) | 62 HZ |
| (186°) | 61.5 HZ |
| (186°) | 61 HZ |
| (188°) | 60.5 HZ |
| (190°) | 60 HZ |
| (192°) | 59.51 HZ |
| (194°) | 59 HZ |
| (196°) | 58.51 HZ |
| (198°) | 58 HZ |
| (198°) | 57.54 HZ |
| (200°) | 57.07 HZ |
| (202°) | 56.6 HZ |
| (204°) | 56.15 HZ |
| (204°) | 55.7 HZ |
| (206°) | 55.25 HZ |
| (208°) | 54.81 HZ |
| (208°) | 54.4 HZ |
| (210°) | 53.96 HZ |
| (212°) | 53.54 HZ |
| (212°) | 53.15 HZ |
| (214°) | 52.73 HZ |
| (216°) | 52.3 HZ |
| (218°) | 51.94 HZ |
| (220°) | 51.56 HZ |
| (220°) | 51.18 HZ |
| (222°) | 50.8 HZ |
| (224°) | 50.44 HZ |
| (224°) | 50.07 HZ |
| (226°) | 49.71 HZ |
| (228°) | 49.36 HZ |
| (228°) | 49.01 HZ |
| (230°) | 48.67 HZ |
| (232°) | 48.33 HZ |
| (232°) | 47.99 HZ |
| (234°) | 47.67 HZ |
| (234°) | 47.34 HZ |
| (236°) | 47.02 HZ |
| (238°) | 46.7 HZ |
| (238°) | 46.4 HZ |
| (240°) | 46.1 HZ |
| (242°) | 45.8 HZ |
| (244°) | 45.48 HZ |
| (244°) | 45.2 HZ |
| (246°) | 44.89 HZ |
| (246°) | 44.6 HZ |
| (248°) | 44.32 HZ |
| (250°) | 44.04 HZ |
| (250°) | 43.76 HZ |
| (252°) | 43.5 HZ |
| (254°) | 43.21 HZ |
| (254°) | 42.95 HZ |
| (256°) | 42.69 HZ |
| (258°) | 42.42 HZ |
| (258°) | 42.17 HZ |
| (260°) | 41.91 HZ |
| (262°) | 41.66 HZ |
| (262°) | 41.4 HZ |
| (264°) | 41.2 HZ |

TABLE 1-continued

| PHASE | FREQUENCY |
|---|---|
| (264°) | 40.9 HZ |
| (266°) | 40.7 HZ |
| (266°) | 40.45 HZ |
| (268°) | 40.21 HZ |
| (270°) | 40.00 HZ |

Once the correct data is obtained from all of the above manipulations, the data is compared with previous readings to assure that the maximum and minimum are repeated to within 20°. If the new, corrected data is found not to be within 20°, all the previous readings will be discarded and the system will repeat all measurements.

To determine the unbalance position, the #1 timer 30 is loaded with a number representing 360° or one revolution. The #2 timer 32 output generates clock pulses which decrement the #1 timer 30. The clock for the #1 timer 30 is dependent on rotor speed. The #1 timer 30 clock rate should be generated in such a way that one revolution counts 360° in the #1 timer 30. If, in the present example, the rotor speed is 50 Hz, the period of a single revolution is 20 milliseconds or 20,000 microseconds. The #1 timer 30 clock should be 20,000/360 for 1° intervals or 20,000/280 for 2° intervals. The clock duration is 55.5 microseconds per degree or 111.1 microseconds for intervals of two degrees. In this mode of operation, the clock of the #2 timer 32 operates at a frequency of 1.25 MHz or 0.8 microseconds for each pulse.

Since at 50 Hz rotational speed, a count of 1388.9 generates a proper sampling frequency, which is one sample per 20°, the same number can be used with the #2 timer 32, to determine the angle at which a maximum or minimum is detected.

The microprocessor 14 compares unbalance amplitude samples to the predetermined set value as soon as an index pulse is generated, indicating that the reference blade has just been detected. The average value of the unbalance is used to determine the predetermined set value for sample comparison. It is determined as follows:

Average value=X

Predetermined set value=90% of 1.57×X where 1.57 is the constant that is used to determine the peak value from the average value.

Once the microprocessor 14 determines that any given input sample is greater than the predetermined set value, it gets a position reading from the #2 timer 32 which stores the angular position. It can be seen that, theoretically, the best resolution that can be achieved by the #2 timer 32 is 20° with a sampling rate of 18 per cycle.

However, if an average is taken using the above procedure to determine position, for 8 or more readings, excellent accuracy can be obtained. This is due to the asynchronous nature of the data samples with respect to the position of the reference blade or index signal. In practice, better than 4° accuracy can be achieved on a 60 blade rotor since the blades are separated by 6°, 4° should be adequate for a balance adjustment to be made to one or more blades.

There is one factor, the rotor speed, which should be considered at this point, which may affect the accuracy of the overall system. It has been assumed throughout above discussion that rotor speed does not change for the duration of the calculation. The microprocessor 14 protects the system from providing erroneous data by measuring the rotor speed and, for example, storing the period of rotation both before and after derivation of unbalance information. Alternatively, the rotor speed could be obtained as a function of the tachometer output for a predetermined interval, measured both before and after the unbalance computations. If the rotor speed has been found to be not within acceptable tolerance limits, all data is discarded and the measurement process repeated.

Thus there has been disclosed a method and apparatus for quantifying imbalance in rotating apparatus and for determining the magnitude and placement of compensating masses to alleviate the unbalance condition. An accelerometer signals the vibration of a rotating machine and, in conjunction with a tachometer, the accelerometer signals are processed, sampled, and pased through a nonrecursive, digital tracking filter which isolates those vibrations occuring at the rotating frequency.

The magnitude of the vibration due to imbalance is ascertained and stored. In a subsequent operation, the location of the maximum vibration is ascertained relative to an index point. The location, expressed in rotational degrees, can be recorded. Phase corrections, necessiated by the digital filter and by the electronic signal acquisition networks modify the position reading and, as a result, the magnitude and location of the point of maximum imbalance can be determined. It is then a relatively simple matter to the mgnitude and positioning of a counter-balancing mass of proper magnitude which when installed at the proper position, corrects the imbalance condition.

During the operation, the frequency of the rotating machinery is closely monitored. If the frequency changes during the course of a measurement, the results are invalidated and the measurement cycle is repeated. The system may be used with acceleration data or, after suitable modification of the accelerometer signals, with velocity or displacement representing signals. Moreover, if more than one accelerometer is available for vibration analysis, then the magnitude and location of imbalance, as determined by each of the sensors, can be ascertained and stored.

A series of counters can be preset with predetermined constants so as to provide precise sampling intervals which are integral fractions of a rotational cycle. Other preset constants in the counters enable the generation of other signals which have a predetermined relationship to the actual rotating frequency of an engine.

Other modifications and variations will occur to those skilled in the art. Accordingly, the scope of the invention should be limited only by the scope of the claims appended hereto.

What is claimed as new is:

1. Apparatus to enable the balancing of the rotating component of complex machinery comprising:
   (a) transducer means for detecting and singalling an imbalance condition in the rotating component;
   (b) signalling means coupled to the rotating component for signalling frequency of rotation;
   (c) sampling means coupled to said signlling means for generating a predetermined number of sampling pulses during each revolution of the rotating machinery;
   (d) data acquisition means, coupled to said transducer means and said sampling means, operative in response to said sampling pulses for providing said predetermined number of data samples each revolution;

(e) analog to digital converting means for providing transducer signals in digital form;

(f) digital filtering means responsive to applied digitized data samples for creating signals representative of the magnitude of a parameter of imbalance of the rotating component; and (g) storage and comparison means for recording the signals dreated in said digital filtering means for determining the signal of greatest magnitude and its time of occurrence;

wherein an imbalanced rotating component can be monitored during operation to determine the magnitude of the imbalance.

2. The apparatus of claim 1, above, further including magnitude determining means coupled to said data acquisition means for signalling the magnitude of a mass that is suitable to balance the rotating element.

3. The apparatus of claim 2, above, wherein said signalling means includes means for signalling an index location on the rotating component and further including (e) locating means coupled to said data acquisition means, said sampling means and said signalling means for corresponding maximum imbalance representing signals to a location on the rotating component.

4. The apparatus of claim 3, above, wherein said magnitude determining means signals both the magnitude of the mass suitable to balance the rotating element and the placement of such a mass relative to the index location to achieve a balance condition.

5. In combination with transducer means to detect and signal vibration of a rotating component of a complex machine capable of generating a unique indexing signal and tachometer means for signalling rotational frequency of the rotating component, apparatus for measuring the magnitude and location of vibration causing imbalance in the rotating machine at any of its normal operating frequencies comprising:

(a) sampling means coupled to the tachometer means for generating a predetermined number of sampling pulses per revolution of the rotating component;

(b) data acquisition means coupled to said sampling means and the transducer means, including digitizing and filter means for providing signals representative of the magnitude of imbalance caused vibration at the then current operating frequency; and (c) position locating means including indexing means coupled to said data acquisition means and operable in response to the indexing signal for signalling the location of the point of maximum imbalance relative to an index location at the then current operating frequency;

whereby the magnitude and location of a compensating mass for correcting the imbalance condition can be determined during the normal operation of the machine at each operating frequency.

6. The apparatus of claim 5, further including storage and comparsion means coupled to said data acquisition means for storing a maximum value of imbalance magnitude, including data processing means for comparing a predetermined proportion of stored values with currently sampled values to record location information relative to a currently sampled value greater than said stored value, whereby on subsequent cycles, an average location can be derived.

7. The method of measuring and locating an imbalance in complex rotating machinery having means to signal an index location, comprising the steps of:

(a) measuring a vibration parameter during rotation at an operating frequency;

(b) filtering the measured vibration parameter to limit the measurement to a parameter at the frequency of rotation;

(c) determining the value of the filtered parameter;

(d) repeating the measuring, filtering and determining steps, signalling values greater than a predetermined percentage of a previously measured value;

(e) measuring the angular displacement from an index location at the instant of said signalled greater value during a revolution;

(f) accumulating and averaging signalled greater values over several revolutions;

(g) accumulating and averaging measured angular displacements over several revolutions;

(h) computing from averaged greater values a corresponding balancing mass magnitude which, if attached to the machinery at a selected location, determined by said accumulated, averaged angular displacements from the index mark, will substantially reduce the magnitude of the measured vibration parameter.

8. The method of claim 7 wherein said vibration parameter corresponds to velocity and wherein said predetermined percentage is 90%.

9. The method of measuring and locating an imbalance in rotating machinery having means to signal an index location, comprising the steps of:

(a) measuring the frequency of rotation;

(b) measuring a parameter related to unbalance;

(c) filtering said parameter though a nonrecursive digital tracking filter;

(d) determining and storing said parameter maximum value during an operating cycle;

(e) signalling parameter values in excess of 75% of measured maximum and the angular displacement from index mark corresponding thereto in a subsequent cycle;

(f) storing the angular dislacement quantity;

(g) repeating steps (e) and (f) for a predetermined number of samples;

(h) averaging the values of angular displacement from the index mark for the predetermined number of successive measurements;

(i) averaging successive signalled parameter values for the predetermined number of samples;

(j) corresponding said maximum average parameter value to a balancing mass magnitude;

(k) placing a balancing mass of said magnitude on the machinery at a location opposite to the measured average angular displacement from the index mark; whereby the application of the balancing mass of the proper magnitude at the proper location substantially corrects the imbalance condition.

10. The method of claim 9 wherein said parameter is acceleration and further including the steps of integrating the measured acceleration to obtain signals representing velocity and correcting said location to account for phase shifts introduced by the measurement process and the data acquisition and processing equipment.

* * * * *